US005146217A

United States Patent [19]

Holmes et al.

[11] Patent Number: 5,146,217

[45] Date of Patent: Sep. 8, 1992

[54] SELECTIVE CALL RECEIVER HAVING CONFIDENTIAL MESSAGE READ PROTECTION

[75] Inventors: Thomas F. Holmes; Karen M. Leonard, both of Boynton Beach, Fla.

[73] Assignee: Motorola, Inc., Schaumburg, Ill.

[21] Appl. No.: 579,228

[22] Filed: Sep. 5, 1990

Related U.S. Application Data

[63] Continuation of Ser. No. 356,486, May 25, 1989, abandoned.

[51] Int. Cl.5 .............................................. H04Q 7/00

[52] U.S. Cl. .......................... 340/825.44; 340/825.34; 340/825.31; 235/382.5

[58] Field of Search ...................... 340/825.44, 825.47, 340/825.48, 825.26, 825.27, 825.31, 825.32, 311.1, 825.34; 364/705.06, 705.08; 368/41, 28, 185; 379/58; 235/382, 382.5

[56] References Cited

U.S. PATENT DOCUMENTS

| | | | |
|---|---|---|---|
| 4,117,542 | 9/1978 | Klausner et al. | 364/900 |
| 4,677,434 | 6/1987 | Fascenda | 340/825.26 |
| 4,839,628 | 6/1989 | Davis et al. | 340/825.44 |
| 4,843,385 | 6/1989 | Borras | 340/825.32 |
| 4,851,653 | 7/1989 | Limisaque et al. | 340/825.31 |
| 4,851,937 | 7/1989 | Sander | 340/825.31 |

FOREIGN PATENT DOCUMENTS

| | | | |
|---|---|---|---|
| 60-189577 | 9/1985 | Japan | 340/825.3 |
| 1-39130 | 2/1989 | Japan | 340/825.34 |
| 2222287 | 2/1990 | United Kingdom | 340/825.3 |

OTHER PUBLICATIONS

Radio Shack Portable Reference Guide TRS-80 Model 4P, ©1983, pp. 1, 5-7.

*Primary Examiner*—Donald J. Yusko
*Assistant Examiner*—Peter S. Weissman
*Attorney, Agent, or Firm*—Daniel R. Collopy; William E. Koch; Vincent B. Ingrassia

[57] ABSTRACT

A selective call receiver 10 requires an access authorization code prior to presenting selected messages and to override a lockout mode.

13 Claims, 3 Drawing Sheets

SELECTIVE CALL RECEIVER HAVING CONFIDENTIAL MESSAGE READ PROTECTION

FIELD OF THE INVENTION

This invention relates in general to selective call receivers, and more particularly to a selective call receiver capable of restricting access to certain received messages.

BACKGROUND OF THE INVENTION

Selective call receivers are widely used to disseminate business and other information. Contemporary pages are known to receive and store a plurality of such messages that can be accessed for presentation at the convenience of the user or individual. However, these messages typically include confidential or proprietary business information that may compromise or undermine the business objectives of the individual if such information were accessible by unauthorized persons. Regrettably, any individual in possession of a contemporary pager may view any of the stored messages. Accordingly, a need exists to distribute confidential or proprietary information to selective call receivers in a manner that protects the confidential information from unauthorized access.

SUMMARY OF THE INVENTION

Accordingly, it is an object of the present invention to provide an improved selective call receiver.

In carrying out the above object of the invention, there is provided a selective call receiver that requires an access authorization code prior to presenting selected messages.

DETAILED DESCRIPTION OF THE INVENTION

Figure 1:
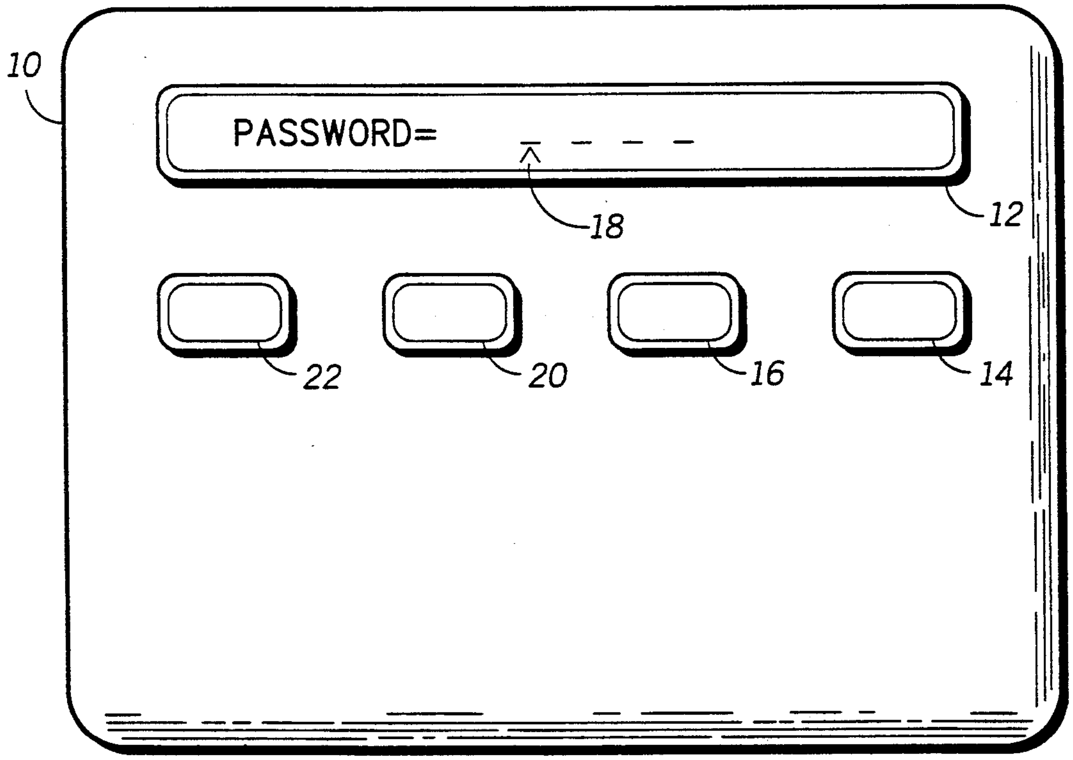
FIG. 1 is an illustration of a selective call receiver in accordance with the present invention.

Referring to FIG. 1, a selective call receiver 10 in accordance with the present invention is shown. The selective call receiver 10 includes a display 12 for presenting received messages to a user or operator. Alternatively, stored messages may be presented either as voice, or printed to provide a permanent record or facsimile of the transmitted information. The selective call receiver 10 may be activated or deactivated by switch 14 as is known in the art. When activated, the selective call receiver 10 operates to receive, store, and present messages upon command by the user. Selected messages may include confidential or proprietary information, the unauthorized disclosure of which may be detrimental to the user, or may compromise the individual's business plans or objectives.

According to the invention, selected messages are designated as requiring access authorization before the message can be displayed or presented to the user. That is, the selective call receiver 10 requires the user to provide an authorization code before some of the received messages will be displayed. To do this, an appropriate request is presented to the user by the display 12 such as that illustrated in FIG. 1. In the preferred embodiment, the user enters the code by activating the switch 16, which causes characters or symbols to be sequentially displayed (scrolled through) at the access code position indicated by the cursor 18. When the appropriate code symbol is presented on the display 12, the individual activates the switch 20, which enters the displayed symbol and causes the cursor 18 to advance to the next code position so that the user may select the next code character by appropriate activation of the switches 16 and 20. In this way, the user enters the several symbols comprising an authorization code. The entered code is compared by the selective call receiver 10 to a predetermined code stored therein. Correspondence of these codes is required before the individual is permitted access to this message, which will be presented by the display 12 or by other suitable means.

In another aspect of the present invention, the individual is provided with a means to "lockout" or inhibit access to all messages stored within the selective call receiver 10 until an appropriate authorization code is provided. To lockout the selective call receiver 10, the individual selects the lockout function by sequential activation (scrolling) of a function select switch 22. When the lockout prompt (icon) is presented on the display 12, the individual activates the switch 20 to inhibit or restrict access to all messages stored in the selective call receiver 10. To "unlock" the selective call receiver 10 the individual enters an authorization code (as discussed above) that may be identical or different from the authorization code required to view selected messages.

Figure 2:
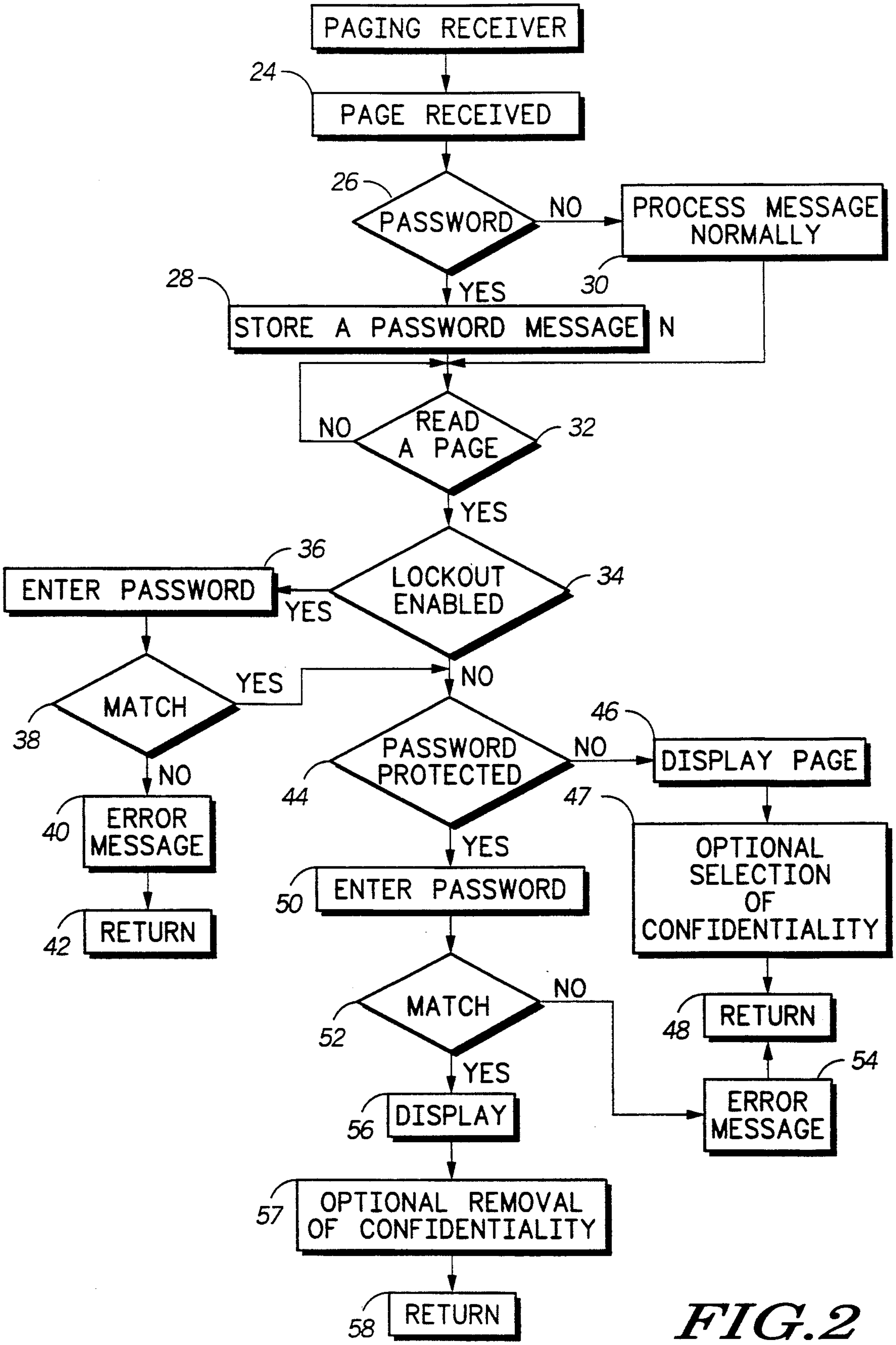
FIG. 2 is a flow diagram illustrating the steps executed by the selective call receiver of FIG. 1.

Referring to FIG. 2, a flow diagram illustrates the steps executed by the selective call receiver 10 in accordance with the present invention. The routine begins in step 24 where a message (page) is received by the selective call (paging) receiver 10. In decision 26, the selective call receiver 10 determines whether the received message requires an authorization code (password) before the message may be presented. Preferably, this is accomplished by detecting the presence of an "authorization required symbol" or code transmitted with the message. Alternatively, the selective call receiver 10 may respond to a plurality of selective call addresses, some of which may be reserved for those messages requiring password access, while other addresses may be used to transmit conventional messages that may be presented without first providing an authorization code. Additionally, according to the other aspect of the present invention, the selective call receiver 10 will require an authorization code before any messages may be presented if operating in the "lockout" or restricted access mode.

Assuming that the determination of the decision 26 is that a password or authorization code will be required prior to presentation of the message, the routine proceeds to step 28, where the message is stored with an indication flag (bit) set to indicate the password requirement. Conversely, if the determination of decision 26 is that the received message does not require a password, the routine proceeds to step 30, where the message is stored as is known in contemporary pagers. In any event, the routine proceeds to decision 32, which determines whether the user has requested to review a message after an appropriate alert is given.

If the user does not desire to read the message, the routine returns to step 24 to check for another page. If another page has not been received, the routine goes again to step 32. The routine remains in this loop until the individual desires to read (review) a message, or until another message is received (which causes the routine to begin again at step 24). Assuming, however, that the determination of decision 32 is that the user has requested to review a message, the routine proceeds to decision 34, which determines whether the "lockout" or inhibit operational mode is active. An affirmative determination of decision 34 routes the routine to step 36, wherein the selective call receiver 10 requests the user to provide an authorization code or password. According to the invention, the user provides this password by appropriate activation of switches 16 and 20 as discussed in conjunction with FIG. 1. After receiving the password, the selective call receiver 10 determines whether the entered authorization code corresponds to a predetermined code stored in a suitable memory means 38. Failure of the entered code to correspond to the predetermined code results in the presentation of an error message (step 40) prior to returning to a standby mode (step 42). However, if the codes correspond, the pager "unlocks" allowing the user to review authorized access messages, which may comprise all of the stored messages, or only those messages not requiring password access depending upon whether the individual knows the password.

Accordingly, the routine proceeds to decision 44, where the selective call receiver 10 determines whether the message requested for presentation requires an authorization code or password. If not, the message is displayed in step 46 and the user is allowed to make the message confidentially protected in step 47, after which the selective call receiver 10 returns to a standby mode (step 48). However, if the determination of decision 44 is that the message requires an authorization code prior to presentation of the message, the routine proceeds to step 50, which prompts the user to enter an authorization code (which may be the same or different as that entered in step 36 to exit the restricted access or "lockout" operational mode). Decision 52 determines whether the entered password corresponds to a predetermined code stored within the selective call receiver 10. Failure of these codes to correlate results in the presentation of an error message (step 54) prior to returning to a standby operation mode (step 48). However, proper correlation or correspondence of the entered authorization to the predetermined code allows the individual access to the message, which is presented by the display 12 (step 56). After displaying the message, the user may remove the confidential protection from the message in step 57 and the selective call receiver 10 then returns to its standby mode (step 58).

Figure 3:
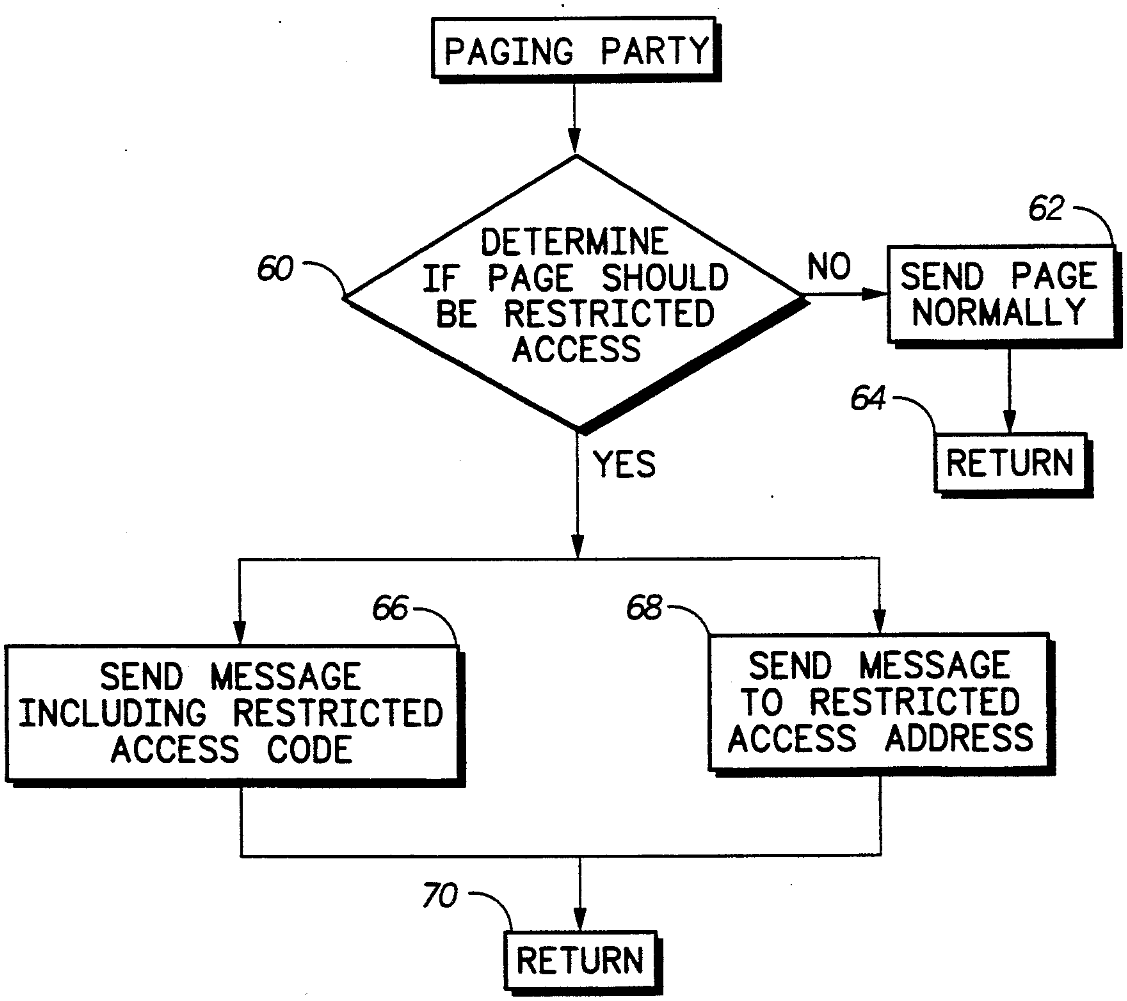
FIG. 3 is a flow diagram illustrating the steps necessary to transmit a message to an individual having the selective call receiver of FIG. 1.

Referring to FIG. 3, the steps necessary to send a message to a selective call receiver 10 in accordance with the present invention are shown. Initially, the individual sending the message (paging party) determines whether the message to be transmitted should require an authorization code or password prior to presentation (decision 60). If the determination of decision 60 is that password access is not required, the message (page) is transmitted via normal operating procedures (step 62), after which the routine returns to other operations (step 64). Conversely, an affirmative determination of decision 60 routes control to step 66, where a symbol or code is added to the message so as to require the user to provide an access code or password before reviewing the message. Alternatively, the routine may be directed to step 68, where a selective call address reserved or associated with restricted access messages is used in the transmission of the message. In any event, after completing transmission of the message the routine returns to other activities in step 70.

In summary, the present invention protects confidential or proprietary information by requiring such messages to require an authorization code before they will be presented to the user. In this way, sensitive information is protected while ordinary or non-proprietary messages may be readily reviewed without the password requirement. Also, the "lockout" or inhibit feature protects the user during those times during which the selective call receiver 10 is left unattended such as when it is placed in a charging apparatus to replenish the selective call receiver 10 energy supply.

We claim:

1. A selective call receiver having a selective call address assigned thereto, the selective call receiver comprising:

means for receiving a message comprising an address portion, a message portion, and a control portion, the address portion corresponding to the selective call address assigned to the selective call receiver;

means for storing at least said message portion of the message;

means for determining in response to said control portion whether the stored portion of the message requires access authorization; and access authorization means coupled to said determining means and said storing means for requiring access authorization before retrieving the stored portion of the message from the storing means if the determining means determines the stored portion of the message requires access authorization, and for not requiring access authorization before retrieving the stored portion of the message from the storing means if the determining means determines the stored portion of the message does not require access authorization.

2. The selective call receiver according to claim 1 further comprising:

means for entering an access code to provide an entered code;

means coupled to said access authorization means for presenting said stored message portion if the stored message portion does not require access authorization and for presenting said stored message portion when the entered code corresponds to a predetermined code if the stored message portion requires access authorization.

3. The selective call receiver according to claim 2 wherein said means for entering comprises at least two keys to enter the access code.

4. A selective call receiver having a predetermined address assigned thereto, the selective call receiver comprising:

operating mode selection means for selecting either a protected or unprotected mode as the current operating mode;

receiver means for receiving messages comprising an address portion, a message portion, and a control portion;

determining means for determining whether the messages are authorized access messages or non-authorized access messages in response to the control portion;

memory means for storing the message portions in response to the address portions corresponding to the predetermined address; and access authorization means for providing access to the message portions of the authorized access messages when operating in the unprotected mode in response to a first predetermined authorization code being inputted by a user, the message portions of the non-authorized access messages being accessible without an authorization code in the unprotected mode, and for providing access to the message portions of the authorized access messages and the message portions of the non-authorized access messages in the protected mode in response to a second predetermined authorization code being inputted by the user.

5. The selective call receiver of claim 4 wherein said first predetermined authorization code is equivalent to said second predetermined authorization code.

6. A method for controlling access to messages received in a selective call receiver comprising the steps of:

receiving a message comprising an address portion, a message portion, and a control portion, the address portion corresponding to a selective call address assigned to the selective call receiver;

identifying the message as an access authorized message if the control portion identifies the message as requiring access authorization;

determining whether messages are access authorized messages or non-access authorized messages prior to presentation;

presenting non-access authorized messages; and presenting access authorized messages only if a user inputted code corresponds to a predetermined code.

7. A method for presenting messages stored in a selective call receiver comprising the steps of:

determining whether the selective call receiver is operating in a restricted access mode;

determining whether stored messages to be presented require access authorization prior to presentation of the messages;

selectably presenting the messages stored if the selective call receiver is not operating in the restricted access mode and the messages stored do not require access authorization prior to presentation;

presenting a request for an authorization code if the selective call receiver is operating in the restricted access mode or the messages stored require access authorization prior to presentation;

receiving an authorization code;

comparing the received authorization code to a predetermined authorization code; and selectably presenting the messages stored if the authorization code received corresponds to the predetermined authorization code if the selective call receiver is operating in the restricted access mode or the messages stored require access authorization prior to presentation.

8. A selective call receiver comprising:

receiving means for receiving and demodulating radio frequency (RF) signals;

decoding means coupled to said receiving means for decoding said demodulated signals to derive selective call messages therefrom, each of said selective call messages comprising a control portion and a message portion;

memory means for storing the message portions of said selective call messages;

access authorization means for determining whether said stored message portions require access authorization in response to the corresponding control portions;

output means for presenting said stored message portions; and output handling means for providing said stored message portions from said memory means to said output means if said determining means determines that said stored message portions do not require access authorization and for providing said stored message portions from said memory means to said output means in response to a first predetermined user input if said determining means determines that said selective call messages require access authorization.

9. The selective call receiver of claim 8 wherein said access authorization means determines that one of said message portions requires access authorization in response to said decoding means decoding said signals to derive said one of said message portions having a predetermined control portion corresponding thereto.

10. The selective call receiver of claim 8 further comprising user input means for user selectably generating control signals, and wherein said access authorization means is coupled to said user input means and determines that one of said message portions requires access authorization in response to said control signals.

11. The selective call receiver of claim 8 further comprising operation mode selection means for user selectably placing said access authorization means in a first operating mode or a second operating mode, and wherein said access authorization means determines that all of said stored message portions require access authorization when operating in said second operating mode.

12. The selective call receiver of claim 11 wherein said access authorization means when operating in said first operating mode determines that one of said stored message portions requires access authorization in response to said decoding means decoding said signals to derive said one of said stored message portions having a predetermined control portion corresponding thereto.

13. The selective call receiver of claim 11 further comprising user input means for user selectably generating control signals, and wherein said access authorization means is coupled to said input means and when operating in said first operating mode determines that one of said message portions requires access authorization in response to said control signals.

* * * * *